United States Patent [19]
Van Der Tol

[11] Patent Number: 5,878,181
[45] Date of Patent: Mar. 2, 1999

[54] OPTICAL NON-LINEAR BRANCHING ELEMENT

[75] Inventor: Johannes Jacobus Gerardus Maria Van Der Tol, Zoetermeer, Netherlands

[73] Assignee: Koninklijke PTT Nederland N.V., Groningen, Netherlands

[21] Appl. No.: 892,539

[22] Filed: Jul. 14, 1997

[30]   Foreign Application Priority Data

Jul. 24, 1996 [NL] Netherlands .............................. 1003670

[51] Int. Cl.$^6$ ................................................... G02B 6/26
[52] U.S. Cl. ................................ 385/122; 385/42; 385/45
[58] Field of Search .............................. 385/4, 5, 15, 42, 385/45, 122

[56]   References Cited

U.S. PATENT DOCUMENTS 4,674,827  6/1987  Izutsu et al. .......................... 350/96.12
5,315,422  5/1994  Utaka et al. ............................... 359/107

OTHER PUBLICATIONS

J. Chen et al; "Adiabatic Polymer–Glass–Waveguide All–Optical Switch"; Jun. 1, 1994; pp. 3375–3383; Applied Optics; vol. 33, No. 16.

S. Chi et al Electronics Letters, Mar. 1, 1990, vol. 26, No. 5, "Non–Linear Y–Junction Coupler" pp. 339–354.

J. Chen et al; "Two–mode Interferometric Polymer–Glass–Wave–guide All–Optical Switches"; pp. 201–208; Optics Communications, Apr. 15, 1993.

H. Fouckhardt et al; "All–Optical Switching in Waveguide X Junctions"; May 1990; pp. 803–809; Journal of the Optical Society; No. 5.

S. Shi et al; Multi–quantum–well Zero–gap Directional Coupler With Disordered Branching Waveguides; Jan. 2, 1995; pp. 79–81; Appl. Phys. Lett; vol. 66, No. 1.

G. Krijnen et al; "Simulation of Low Insertion Loss Non–linear Y–Junctions"; Nov. 15, 1990; Sensors & Actuators (Optical Transducers), Proceedings S&A Symposium Of The University Of Twente, Enschede.

H. Fouckhardt et al; "All–Optical Switching in Waveguide X–Junctions"; May 1990; pp. 803–809; Journal Of The Optical Society Of America; vol. 7, No. 5.

*Primary Examiner*—John D. Lee
*Assistant Examiner*—Juliana K. Kang
*Attorney, Agent, or Firm*—Frishauf, Holtz, Goodman, Langer & Chick

[57]   ABSTRACT

A low-loss optical 1×2 branching element comprises a symmetrical Y junction (4) with identical branches (4.1, 4.2) and an asymmetric Y junction (5) with different branches (5.1, 5.2). The Y junctions are coupled by means of a common trunk (6) in which two modes that are of unequal mode order can propagate. Located centrally in and/or near the trunk are optically non-linear partial areas (7, 7a, 7b). The non-linear partial areas (7 and/or 7a, 7b) and the asymmetric Y junction (5) are dimensioned so that, for a given signal power, in one signal direction (arrow D) the branching element acts as a 3 dB splitter, whereas in the other signal direction (arrow U) the loss is <<3 dB.

14 Claims, 2 Drawing Sheets

OPTICAL NON-LINEAR BRANCHING ELEMENT

BACKGROUND OF THE INVENTION

1. Scope of the Invention

The invention is in the field of optical devices for systems transporting and processing optical signals. In particular the invention concerns an optical 1×2 branching element provided with three optical ports, in which an optical signal injected via a first optical port is split into two signals of equal power that exit via a second and a third optical port respectively, and in which an optical signal injected via the second or the third port exits via the first optical port. For a branching element with an identical function, an application has also simultaneously been filed by applicant in the Netherlands (date of application: 24 Jul. 1996; application number: NL 1003669; title of the application: Optical non-linear branching element with MZ interferometer). The specification of said simultaneous application, hereinafter referred to as application P1, is deemed to be incorporated in the present application.

2. State of the Art

The splitting of optical signals is one of the most important basic functions in optical systems and networks. Optical signal splitters based on such channel-shaped waveguides as optical fibres or integrated waveguide structures are based on two fundamentally different physical principles. One type of signal splitter uses interference, e.g. the directional coupler and the splitter based on an MZ-interferometer. The second type of signal splitter uses symmetry, e.g. the symmetrical Y splitter and the asymmetric Y splitter dimensioned as mode filter.

For passive optical networks (PONs), used for both signal distribution and bidirectional traffic, and which have a tree-like branched structure, usually with a high degree of bifurcation, signal splitters are required on a large scale. For this purpose, (1→N) splitters are being designed which are mostly composed of (1→2) splitters of the above-mentioned types. In each (1→2) splitter, the optical signal is subject to a reduction in power of 3 dB in each of the two bifurcation directions. This is unavoidable (and natural) in the direction of further bifurcation (downwards), as the presented signal divides itself between the two possible bifurcation directions. Owing to time-reversal invariance (reciprocity) to which physical laws are subject, within the same structure this reduction also occurs for optical signals in the opposite direction (upwards), but this time as a real loss of signal. One way to avoid this loss in the upward direction is to let the wave-guiding structure in upward direction be different from that in downward direction. This can be achieved by switching the signals, e.g. with the use of externally, electrically or optically, controlled switches. However, this has the drawback that such a network no longer is passive, and in addition requires a complicated control system for the many switches.

Another option is the application of non-linear optical effects in the splitting structures indicated above, enabling a light signal itself to cause a switching effect to occur. G. J. M. Krijnen et al, "Simulation of low insertion loss non-linear Y junctions", Sensors & Actuators (Optical Transducers), Proceedings S & A symposium of the University of Twente, Enschede, The Netherlands, Nov. 15–16, 1990, University of Twente/Kluwer Technical Books, Deventer-Antwerpen, pp. 323–328 (hereinafter referred to as "Krijnen et al") discloses a simulation study of a symmetrical Y junction with a monomodal trunk and two monomodal branches, the branches of which at least are formed by identical waveguide sections in a non-linear optical medium. As a result of the symmetry, power splitting occurs in the bifurcation direction (downwards). In the upward direction, a light signal presented through either of the branches causes the index of refraction to increase, as a result of which the symmetry is broken. This causes the Y junction to become asymmetric and to act as a mode filter for the said signal: the light signal propagates fully as a zero-order mode signal in the trunk of the Y junction. In this connection, it is noted that in the above-mentioned types of unswitched (1→2) splitter, one part (half) is always converted into a first-order mode, said part radiating off upon entering the monomodal trunk of the Y junction, resulting in the loss of power mentioned. H. Fouckhardt and Y. Silberberg, "All-optical switching in waveguide X junctions", J. Opt. Soc. Am. B, Vol. 7, No. 5, May 1990, pp. 803–809 (hereinafter referred to as "Fouckhardt and Silberberg") disclose an asymmetric X junction in a non-linear medium that enables an optical signal to be switched using an optical control signal to be injected separately. Said control signal exhibits a switching effect (see more in particular FIG. 4(c) and FIG. 5(c) of Fouckhardt and Silberberg) which is similar to that described for the non-linear Y junction of Krijnen et al. A drawback of the splitting structures described in Fouckhardt and Silberberg, and Krijnen et al is that either they require extremely high optical powers, or relatively great non-linear optical effects are required, for which no suitable materials are available to date.

The entire contents of Krijnen et al, Fouckhardt and Silberberg, and U.S. Pat. No. 5,315,422 are incorporated herein by reference.

SUMMARY OF THE INVENTION

The object of the invention is to provide a branching element that has the desired property with regard to low power losses of splitter structures as described above, but in which the required non-linear effects can remain limited to a much greater degree, enabling it to be realized at the present state of the art. It is based on the fact that in interferometric structures, such as those based on a directional coupling structure or a TMI coupling structure (Two Mode Interference), instead of using absolute changes in the index of refraction, phase changes in optical signals are used. Said phase changes are determined by the product of the change in the index of refraction and the length of the optical path along which the change in the index of refraction is realized ($\delta\phi = \delta n \times L$). This means that the length of the optical path can serve as an enlarging factor, enabling relatively small non-linear effects to be used for switching purposes, as long as the optical path length is sufficient.

For this purpose, an optical branching element of the above-mentioned type comprises according to the invention a symmetrical first Y junction provided with two channel-shaped waveguiding branches with, at least generally, equal propagation constants, an asymmetric second Y junction provided with two channel-shaped waveguiding branches with unequal propagation constants, and an area of an optically transparent medium with an intensity-dependent index of refraction, which area will hereinafter be referred to as non-linear area, wherein the first and second Y junctions have a common waveguiding trunk, hereinafter referred to simply as trunk, and in which one of the two branches of the first Y junction forms the first port, and the two branches of the second Y junction form the second and third ports, and wherein the trunk has been dimensioned for interference of two guiding modes of unequal order, and that the non-linear area encloses one or more elongated partial areas that are located in, or at least near, the trunk and are oriented along a central axis of the trunk.

The non-linear partial areas are positioned in or near the trunk in such a way that, in the event of differences in intensity occurring in the two guided modes, each partial area will mainly cause a change to occur in the effective index of refraction for only one of the two guided modes. In a preferred embodiment in which mainly the index of refraction of a zero-order guided mode, or, more generally, a guided mode with an even order number, is affected, the non-linear area of the branching element encloses an elongated area that is located in a central part of the trunk. In a preferred embodiment in which mainly the index of refraction of a first-order guided mode, or, more generally, a guided mode with an odd order number, is affected, the non-linear area of the branching element encloses two elongated partial areas located on either side of the trunk. A combination is also possible.

In the two known types of 2×2 couplers already referred to above, i.e. the directional coupler and the TMI (Two Mode Interference) coupler, the interference occurs between modes of different order. The inventions applies to both types of coupler in two further preferred embodiments.

U.S. Pat. No. 5,315,422 discloses an optical logical element that can be used to perform an XOR function. This logical element comprises a waveguide structure based on an MZ interferometer, in which in each of the two waveguide branches, an element that can be phase-modulated is incorporated, the index of refraction of which undergoes a change when it is struck by light from outside the waveguide structure. For these elements that can be phase-modulated, non-linear optical materials are used, e.g. in a semiconductor system based on InP in a MQW (Multiple Quantum Well) structure. Such non-linear optical materials, and in a structure identical to that in which the element that can be modulated has been realized, can in principle also be used as the non-linear partial areas incorporated into and/or near the common trunk of the two Y junctions that make up the branching element according to the invention. However, in those partial areas the changes in the index of refraction are not caused by light from an exterior source, but solely by changes in intensity of the light signals propagating within the trunk and the non-linear partial areas located in it or near to it.

BRIEF DESCRIPTION OF THE DRAWINGS

The drawings will be explained in greater detail by means of a description of an exemplary embodiment. In the drawings.

DESCRIPTION OF AN EXEMPLARY EMBODIMENT

As used herein, Y junction refers to an optical waveguide structure of two separate channel-shaped waveguides, referred to as branches, which converge into, or diverge from, a third channel-shaped waveguide, referred to as trunk. Said trunk may be a single waveguide, but it can also consist of two, generally parallel, coupled waveguides. A symmetrical Y junction has branches with equal propagation constants, whereas an asymmetric Y junction has branches with (slightly) different propagation constants. According to this definition, both a TMI (Two Mode Interference) coupler and a directional coupler can be considered to consist of two coupled Y junctions with a common trunk. In this, the trunk of a TMI coupler is a single bimodal waveguide section, whereas the trunk of the directional coupler consists of two parallel coupled waveguide sections.

Although the principle of the invention is suitable for application on a wider scale, the exemplary embodiments described hereinafter will assume Y junctions the branches of which are monomodal waveguide channels, and with the common trunk being formed by a bimodal waveguide section in the case of a TMI coupler, and by two parallel monomodal waveguide sections in the case of the directional coupler.

Figure 1:
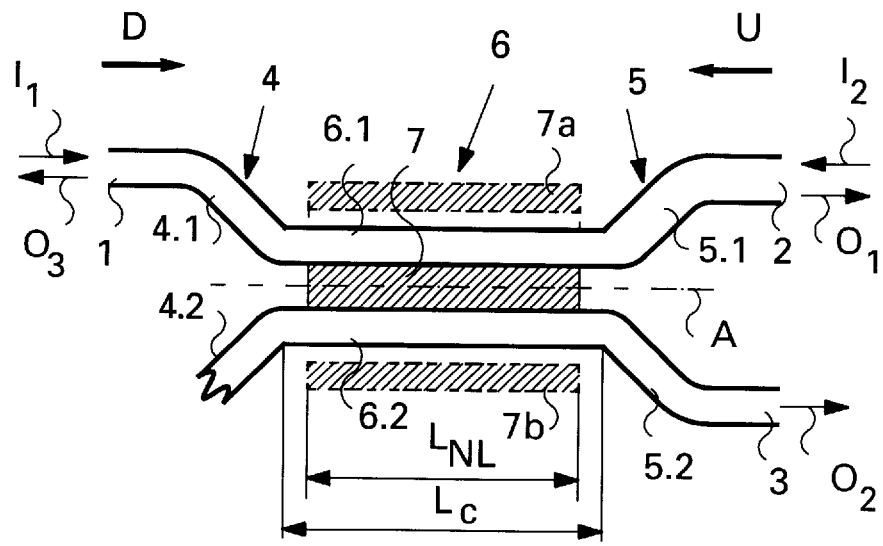
FIG. 1 shows schematically an optical branching element according to the invention, based on a directional coupling structure.

FIG. 1 shows schematically a wave guide pattern for an optical branching element according to the invention in a first variant, which is based on a directional coupler structure. The branching element is provided with three ports 1, 2, and 3. In one signal direction (arrow D), referred to as the downward signal direction, the first port 1 serves as an optical signal input, and the second and third ports 2 and 3 serve as optical signal outputs. In the opposite signal direction (arrow U), referred to as the upward signal direction, the second and third ports 2 and 3 serve as signal inputs, and the first port 1 serves as signal output. The waveguide pattern of the branching element comprises a symmetrical Y junction 4 with monomodal waveguide branches 4.1 and 4.2, and an asymmetric Y junction 5 with monomodal waveguide branches 5.1 and 5.2. The branches of the Y junction 4 are positioned symmetrically relative to a central axis A and have equal propagation constants (indicated by equal widths). The branches of the asymmetric Y junction 5 have unequal propagation constants and are positioned asymmetrically relative to the central axis (indicated by a difference in width, in which 5.1 and 5.2 correspond to a "wide" waveguide and a "narrow" waveguide, respectively). The two Y junctions 4 and 5 have a common trunk 6. The trunk 6 consists of two monomodal waveguide sections 6.1 and 6.2, which run parallel along a coupling length $L_C$, and which connect the branches 4.1 and 5.1, and 4.2 and 5.2 with each other, respectively. One end of the branch 4.1 forms the port 1, while the ends of the branches 5.1 and 5.2 form the ports 2 and 3 respectively. Between the waveguide sections 6.1 and 6.2, a non-linear area 7 has been incorporated with a length $L_{NL}$. This non-linear area 7 is formed from an optically transparent medium with an intensity-dependent index of refraction, e.g. as a result of a Kerr-type non-linearity. Possibly, instead of the non-linear area 7 or additionally, two further non-linear areas 7a and 7b can be positioned on either side of the trunk 6.

Figure 2:
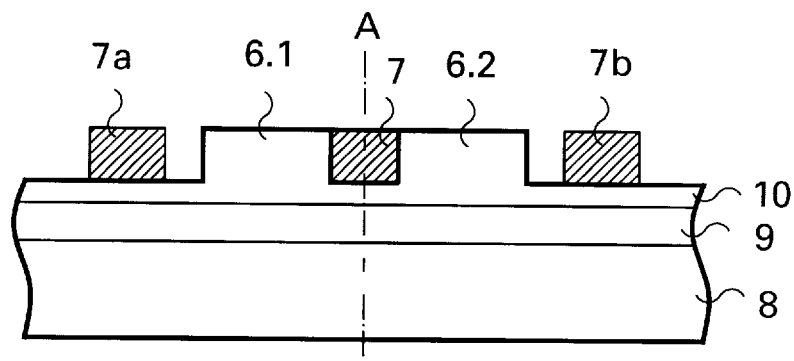
FIG. 2 shows schematically a part of the branching element according to FIG. 1 in a cross-section.

FIG. 2 shows, for an integrated optical embodiment of the branching element according to FIG. 1, realized by way of an example on a basis of indium phosphide (InP), a cross-section of the trunk 6. On a substrate 8 of InP are located a light-conducting layer 9 of InGaAsP and an upper layer 10 of InP. Ridge-like elevations in the upper layer define the waveguide sections 6.1 and 6.2 of the trunk 6, while the space between the ridge-like elevations, which has been filled along a length $L_{NL}$ with optically non-linear material, forms the non-linear area 7.

Figure 3:
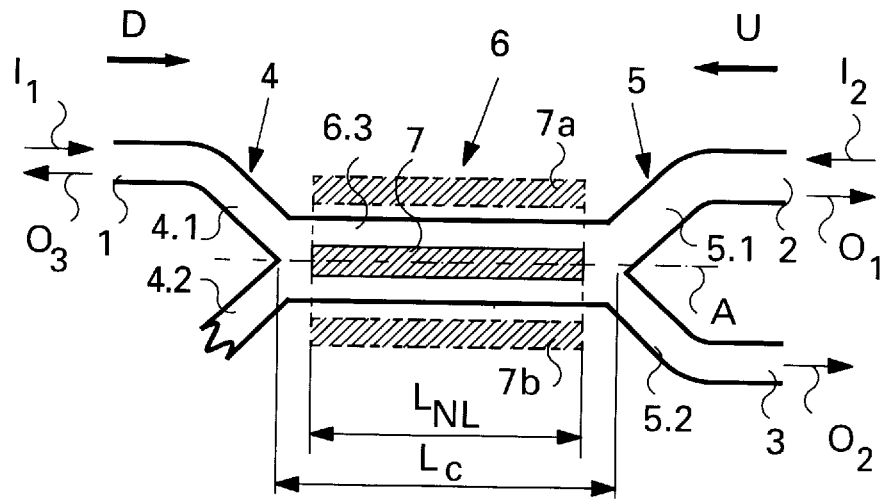
FIG. 3 shows schematically an optical branching element according to the invention, based on a TMI coupling structure.
Figure 4:
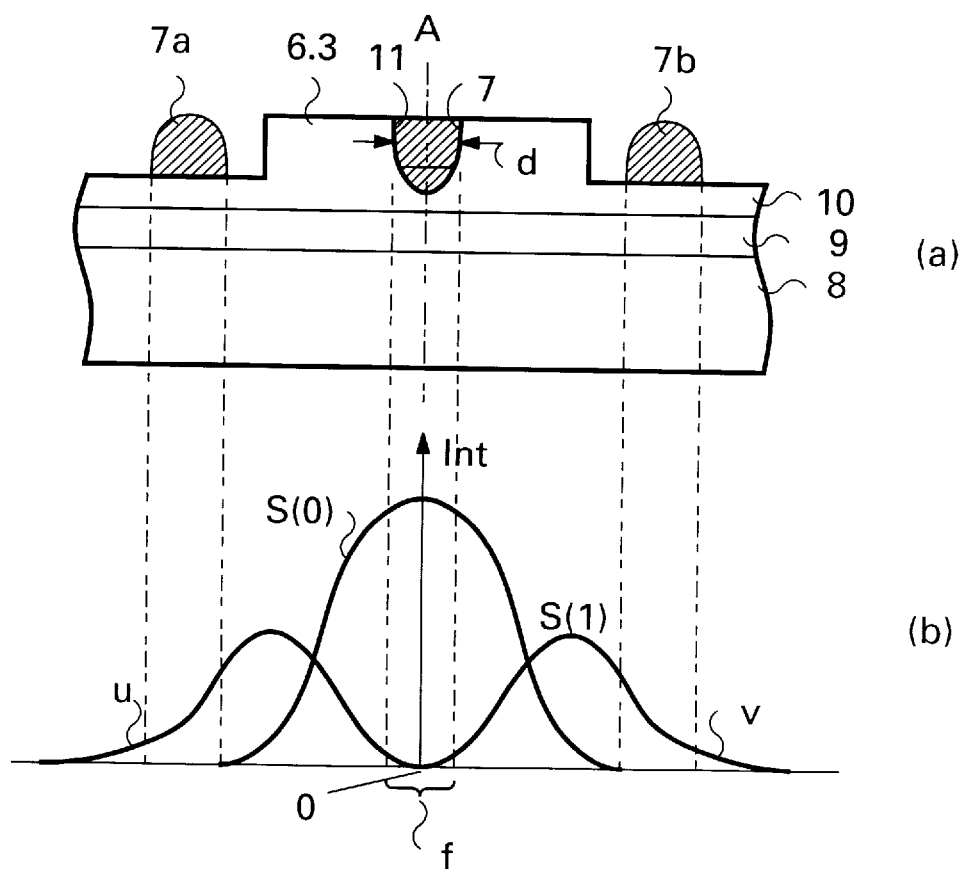
FIG. 4 in subfigure (a) shows schematically part of the branching element according to FIG. 3 in a cross-section; and in subfigure (b) shows a graphical representation of the intensity distribution of two partial signals across the part shown in subfigure (a).

FIG. 3 shows schematically a waveguide pattern for a second variant of the optical branching element, which is based on a TMI coupling structure. Parts of the branching element corresponding to the first variant have been given identical number and letter designations. The trunk 6 is now formed by a bimodal waveguide 6.3. In a manner similar to FIG. 2 for the first variant, section (a) of FIG. 4 shows a cross-section of the trunk 6 of the second variant. Located centrally along a length $L_{NL}$ in the ridge-like elevation defining the bimodal waveguide section 6.3, is an open area 11 that, filled with an optically non-linear material, forms the non-linear area 7.

The operation of the branching element will now be explained on the basis of the second variant. The operation of the first variant is entirely analogous.

In the downward direction (arrow D), the operation is as follows. A light signal $I_1$ entering via the first port 1 of the branching element and reaching the trunk via branch 4.1, will propagate in the form of a first partial signal S(0) in a zero-order guided mode and of a second partial signal S(1) in a first-order guided mode. Owing to the symmetry of the Y junction 4 these signals are of equal intensity, i.e. each of the two guided modes in the trunk contains half of the optical power injected with the light signal $I_1$ via port 1. It should be noted that only one of the two branches of the symmetrical Y junction, in this case the branch 4.1, is used as port 1; the presence of the other branch is required solely to excite the two guided modes in the central trunk to an equal extent. The power distribution at the end of the asymmetric Y junction 5 among the branches 5.1 and 5.2 depends on the relative difference in phase with which the two guided modes arrive there. For a symmetrical power distribution (½/½) a phase difference $\delta\phi_D=90°$ (or an odd multiple thereof) is required.

Section (b) of FIG. 4 shows a qualitative distribution of the signal intensity (Int) along the cross-section of the trunk for the partial signals S(0) and S(1). This shows that in the centre of the bimodal section 6.3, this distribution is at its greatest for the partial signal S(0), and at its smallest (zero) for the partial signal S(1). Furthermore, the distribution for S(1) has two equal maxima, which are slightly smaller than half the maximum for S(0), either side of this centre, and a negligible intensity in an area f around the minimum in the centre. Furthermore, the distribution for S(1), as a result of evanescent fields of the first-order partial signal which are relatively large relative to the those of the zero-order signal, has relatively large offshoots u and v that extend outside the area under the ridge-like elevation of the section 6.3. This means that, if the width d of the non-linear area 7 corresponds to the area f, only the partial signal S(0) will be affected by the non-linear partial area 7, whereas the partial signal S(1) will be affected hardly or not at all. The condition regarding the required difference in phase $\delta\phi_D=90°$ therefore depends on the signal power. In order to fulfil this condition, the length $L_{NL}$ of the non-linear area, with a suitably chosen dimension for its cross-section, is adapted to an operating power desired for a situation in which the branching element is to be used. As the effective length of the non-linear area 7 cannot be longer than the actual length of the trunk, i.e. $L_{NL}<L_C$, and as the length of the trunk can each time be made an odd multiple of the smallest length $L_0$ at which the TMI section still operates as a 3 dB splitter, i.e. $L_C=(2n+1)L_0$ for n=1, 2, ..., this condition can always be met.

In the upward direction (arrow U), the operation is as follows. A light signal $I_2$ (which has the same intensity as the light signal $I_1$ in the downward case), which enters via the second port 2 of the branching element and reaches the trunk via the "wide" branch 5.1 of the asymmetric Y junction 5, will propagate in the trunk in the form of a first partial signal T(0) in a zero-order guided mode and of a second partial signal T(1) in a first-order guided mode. Owing to the asymmetry of the Y junction 5, these two partial signals are of unequal intensity. The asymmetry of the Y junction 5 is chosen such that the partial signal T(0) contains a fraction x more than half (i.e. (½+x), with 0<x<½) of the power injected into the port 2, while the partial signal T(1) contains the remainder of the power (i.e. (½−x)). The intensity of the partial signal T(0) therefore is greater than the intensity of the partial signal T(1), with the result that the partial signal T(0), owing to the presence of the non-linear area 7, is subjected to a phase shift $\delta\phi_U$ which exceeds the phase shift $\delta\phi_D$ of the partial signal S(0) in the downward direction. By dimensioning the non-linear area 7 for the desired operating power in such a manner that $\delta\phi_U-\delta\phi_D{}^V=90°$ along the trunk, the two partial signals T(0) and T(1) will interfere, insofar as their amplitudes match, maximally into a symmetrical signal that will propagate as a zero-order mode signal into the branch 4.1 and will exit via port 1 as signal $O_3$. The difference in amplitude on the other hand, results in an asymmetric signal that radiates off and may consequently form a relatively minor loss, depending on the value chosen for x.

In the upward direction (arrow U), the light signal $I_2$ can also enter via the third port 3 of the branching element and reach the trunk via the "narrow" branch 5.2 of the asymmetric Y junction 5. In that case, the partial signal T(0) has the smaller intensity. The partial signal T(0) undergoes a phase shift $\delta\phi_U$ in the trunk that is 90° less than the phase shift $\delta\phi_D$ of the partial signal S(0) in the downward signal direction. At the dimensions chosen for the non-linear area 7 the formula $\delta\phi_U-\delta\phi_D=-90°$ applies, and the two partial signals T(0) and T(1) interfere maximally into a symmetrical signal that propagates as a zero-order mode signal in the desired branch 4.1 of the symmetrical Y junction 4 and exits via port 1 as signal $O_3$.

It should be noted that the partial signals T(0) and T(1) have similar distributions of intensity as demonstrated for the partial signals S(0) and S(1), albeit with higher or lower maxima, corresponding to the fraction x.

The foregoing description has been made with respect to an optical branching element having the sole presence of the non-linear area 7. The operation is similar if, instead of the area 7, the non-linear areas 7a and 7b are present, which are positioned in such a way that they will affect only the (offshoots u and v of the) partial signal S(1) or T(1) (see FIG. 4). If both the non-linear area 7 and the further non-linear areas 7a and 7b are present, the operation in the downward direction (no difference in signal intensity) is less dependent on, or even almost independent of, the signal power used, and the difference in phase required for the 3 dB splitter function will have to be obtained by the choice of linear optical path length. In the upward signal direction (different signal intensities), the effect for obtaining the desired differences in phase is amplified (push/pull effect), so a smaller length will suffice for the non-linear areas 7, 7a, and 7b.

In order to be able to efficiently use the non-linear effect, the value of x (the deviation from the symmetrical power distribution) must be relatively large, whereas the losses occurring in the process must remain small. As an example, for x=0.25, loss is approx. −0.3 dB. The fact that this is possible can be demonstrated by means of a relatively simple calculation. This calculation is analogous to the calculation elaborated in the simultaneous application P1 referred to above, and will therefore not be repeated here.

In an integrated version of the branching element, the non-linear elements 7, 7a, and 7b in figures FIG. 1,-,4 may be realized by means of areas with a MQW structure, such as disclosed for example in U.S. Pat. No. 5,315,422. Such areas can be grown in the positions indicated once the waveguide pattern of a directional coupler or a TMI coupler has first been realized on a substrate. If this structure has a non-linear constant $n_2=10^{-4}$ cm$^2$/W, in order to achieve a difference in phase of 90° with an incoming signal power of 0.1 mW of an optical signal with a wavelength of 1.5 μm, and an asymmetry x=0.25 in the asymmetric Y junction 5, the non-linear elements must each have a length $L=15\times\alpha^{-1}$ μm. In this formula, a is a so-called overlap factor, which indicates which fraction of the intensity distributions of the partial signals T(0) and T(1) affects the non-linear area. The overlap factor is therefore related to the size of the cross-section of the non-linear area. An acceptable value is $\alpha=0.1$. In this case, $L_{NL}=150$ μm, which is very short for an integrated optical component. If the signal power is ten times that value (or one-tenth of it), $L_{NL}$ is selected to be shorter (longer) by a factor of ten.

In the simultaneous application P1, a number of prerequisites for the proper operation of the non-linear branching element described in said application have been summed up. Mutatis mutandis, these prerequisites also apply in the present case, and will not be repeated here. A further prerequisite for proper operation is that the branching element be used at an operating power level that is generally equal for both signal directions (arrows D and U), variants with three non-linear areas (7, 7a, and 7b) again being, in the downward direction (arrow D), much less, or even not at all, critical regarding the operating power.

I claim:

1. An optical branching element provided with three optical ports, in which an optical signal injected via a first optical port is split into two signals of equal power that exit via a second and a third optical port respectively, and in which an optical signal injected via the second or third port exits via the first optical port, said branching element comprising:

a symmetrical first Y junction provided with two channel-shaped waveguiding branches with, at least generally, equal propagation constants, an asymmetric second Y junction provided with two channel-shaped waveguiding branches with unequal propagation constants, and a non-linear area of an optically transparent medium with an intensity-dependent index of refraction, wherein the first and second Y junctions have a common waveguiding trunk, wherein one of the two branches of the first Y junction forms the first port, and the two branches of the second Y junction form the second and third ports, wherein the trunk is dimensioned for interference of two guiding modes of unequal order, and wherein the non-linear area encloses at least one elongated partial area which is located either in or near the trunk and which is oriented along a central axis of the trunk.

2. An optical branching element according to claim 1, wherein the non-linear area encloses an elongated area that is located in a central part of the trunk.

3. An optical branching element according to claim 2, wherein the two Y junctions form part of a directional coupling structure, and the trunk comprises two coupled substantially parallel waveguide sections between which the non-linear area is located.

4. An optical branching element according to claim 3, wherein the at least one partial area of the non-linear area comprises a multiple quantum well structure in a semiconductor material.

5. An optical branching element according to claim 2, wherein the two Y junctions form part of a two mode interference coupling structure, and the trunk comprises a bimodal waveguide section.

6. An optical branching element according to claim 5, wherein the bimodal waveguide section is generally strip-shaped and includes a recess in which the non-linear area is located.

7. An optical branching element according to claim 6, wherein the at least one partial area of the non-linear area comprises a multiple quantum well structure in a semiconductor material.

8. An optical branching element according to claim 5, wherein the at least one partial area of the non-linear area comprises a multiple quantum well structure in a semiconductor material.

9. An optical branching element according to claim 2, wherein the non-liner area encloses two elongated partial areas located on either side of the trunk.

10. An optical branching element according to claim 2, wherein the at least one partial area of the non-linear area comprises a multiple quantum well structure in a semiconductor material.

11. An optical branching element according to claim 1, wherein the non-linear area encloses two elongated partial areas located on either side of the trunk.

12. An optical branching element according to claim 11, wherein the at least one partial area of the non-linear area comprises a multiple quantum well structure in a semiconductor material.

13. An optical branching element according to claim 1, wherein the at least one partial area of the non-linear area comprises a multiple quantum well structure in a semiconductor material.

14. An optical branching element according to claim 13, wherein the at least one partial area of the non-linear area comprises a multiple quantum well structure in a semiconductor material.

* * * * *